J. M. NYCE.
Vehicle-Springs.
No. 211,924.                    Patented Feb. 4, 1879.
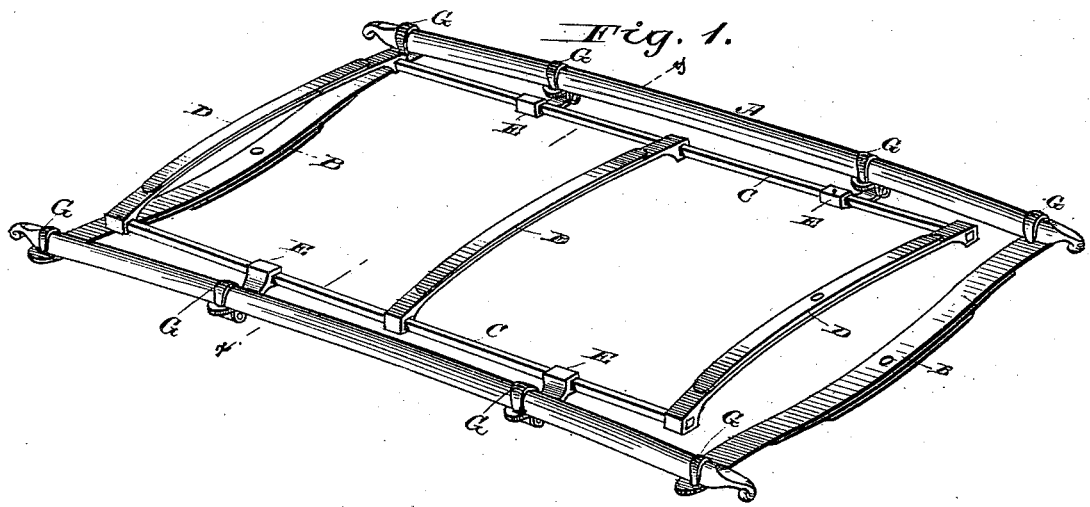
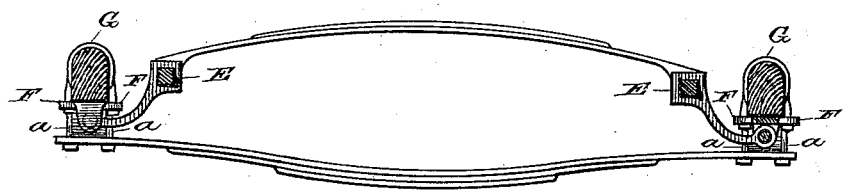
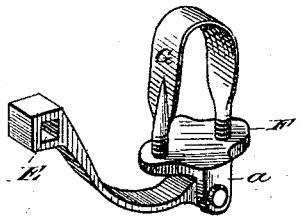
Attest:
H. L. Perrine
Am Long
John M. Nyce
Inventor
By H. F. Abbot
Atty.

UNITED STATES PATENT OFFICE.

JOHN M. NYCE, OF BELVIDERE, NEW JERSEY, ASSIGNOR TO DEWITT NYCE & CO., OF SAME PLACE.

IMPROVEMENT IN VEHICLE-SPRINGS.

Specification forming part of Letters Patent No. 211,924, dated February 4, 1879; application filed November 15, 1878.

*To all whom it may concern:*

Be it known that I, JOHN M. NYCE, of Belvidere, in the county of Warren and State of New Jersey, have invented certain new and useful Improvements in Wagon-Springs; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1 is a perspective of side bars with the wagon-body-supporting frame suspended thereon; Fig. 2, a transverse section thereof on the line $x\,y$ of Fig. 1, and Fig. 3 a view of coupling with clip that secures the same to the side bars.

My invention relates to what are known as "side-bar wagons," and has particular reference to the support of the carriage-body on springs; and it consists of a frame composed of parallel rods connected by transverse springs, and suspended between and from the side bars of the carriage or wagon by means of hinged couplings.

In the accompanying drawings, A indicates the side bars, which are connected to each other by springs B, which may be flat or semi-elliptical, and the whole may be secured to the back axle and front bolster or head-block of the running-gear, or it may be secured to springs thereon, or in any other suitable manner.

Between the side bars A there is suspended a frame composed of rods C and cross-springs D. The rods C are of metal or wood, or other suitable material, and are secured to the springs D by passing them through openings at the ends of the springs. These openings may be made in the ends of the springs themselves, as represented in Fig. 1, or they may consist of clips, which may be U-shaped or other shaped pieces of metal, the ends of which are passed through the springs and the heads clinched, so as to firmly secure the clip to the spring. These clips clasp the rods to the springs; but instead of the clips, or the eyes or openings in the springs themselves, any other suitable mode of connecting the rods and springs may be employed.

The rods D, or the frame composed of the rods and cross-springs, are coupled to the side bars, A, by hinged couplings E. These couplings have eyes or openings formed in one end, through which the rods D pass, as shown in Figs. 1 and 2, and the other end is hinged to the ears $a$ of a plate, F, which forms the lower part of a clip, G, that embraces or encircles the side bars, A, as indicated in Figs. 1 and 2. The end of the coupling E to which the rods D are attached is above the plane of the ears to which the other end is hinged, in order that the frame composed of the rods and cross-springs will not drop or be pressed down, so as to impair the function thereof.

The coupling is hinged by passing a pin or bolt through holes in the ears $a$ and an opening in the coupling next thereto; but any other suitable method than that mentioned of securing the coupling to the side bars, A, will answer.

The body of the wagon or carriage rests upon the frame composed of the rods and cross-springs, and is bolted thereto. Any further description of the wagon is unnecessary here, any skillful mechanic being able to construct the same; and especially is it unnecessary, since my invention relates only to the support of the body of the wagon, and that feature has been described.

What I claim is—

The within-described frame for supporting wagon-bodies, composed of parallel rods C and transverse springs D, in combination with side bars, A, and hinged couplings E, substantially as set forth.

In testimony that I claim the foregoing as my own I affix my signature in presence of two witnesses.

JOHN M. NYCE.

Witnesses:
R. T. DRAKE,
MOSES A. DEWITT.